(12) United States Patent
Pometun et al.

(10) Patent No.: US 8,885,874 B2
(45) Date of Patent: Nov. 11, 2014

(54) METHOD AND APPARATUS FOR EMBEDDING IMAGE-RELATED INFORMATION IN IMAGE

(75) Inventors: Sergey Pometun, Kyiv (UA); Maksym Koshel, Kiev (UA); Nikolay Polyanovskiy, Kiev region (UA); Dmitriy Dorogovtsev, Kiev (UA); Svitlana Volkova, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 13/615,886

(22) Filed: Sep. 14, 2012

(65) Prior Publication Data

US 2013/0259295 A1  Oct. 3, 2013

(30) Foreign Application Priority Data

Apr. 3, 2012  (KR) .......................... 10-2012-0034582

(51) Int. Cl.
*G06K 9/00* (2006.01)

(52) U.S. Cl.
USPC .......................................................... 382/100

(58) Field of Classification Search
None
See application file for complete search history.

(56) References Cited

U.S. PATENT DOCUMENTS

| | | | |
|---|---|---|---|
| 6,381,341 B1* | 4/2002 | Rhoads ......................... | 382/100 |
| 6,674,874 B1* | 1/2004 | Yoshida et al. ............... | 382/100 |
| 6,823,455 B1* | 11/2004 | Macy et al. ................... | 713/176 |
| 6,888,952 B2 | 5/2005 | Venkatesan et al. | |
| 7,197,164 B2 | 3/2007 | Levy | |
| 2001/0026616 A1* | 10/2001 | Tanaka ......................... | 380/202 |
| 2003/0076979 A1* | 4/2003 | Matsui ......................... | 382/100 |
| 2003/0185417 A1* | 10/2003 | Alattar et al. ................. | 382/100 |
| 2005/0265576 A1 | 12/2005 | Seong et al. | |
| 2006/0153422 A1* | 7/2006 | Tapson et al. ................. | 382/100 |
| 2008/0137903 A1* | 6/2008 | Nakamura et al. ............ | 382/100 |
| 2010/0046606 A1 | 2/2010 | Celik et al. | |

OTHER PUBLICATIONS

Zhang, Liwei, Yuesheng Zhu, and Lai-Man Po. "A novel watermarking scheme with compensation in bit-stream domain for H. 264/AVC." In Acoustics Speech and Signal Processing (ICASSP), 2010 IEEE International Conference on, pp. 1758-1761. IEEE, (Mar. 14, 2010).*

Podilchuk, Christine I., and Edward J. Delp. "Digital watermarking: algorithms and applications." Signal Processing Magazine, IEEE 18, No. 4 (Jul. 2001): 33-46.*

Noorkami, Maneli, and Russell M. Mersereau. "A framework for robust watermarking of H. 264-encoded video with controllable detection performance." Information Forensics and Security, IEEE Transactions on 2, No. 1 (Mar. 2007): 14-23.*

Malvar, Henrique S., and Dinei AF Florêncio. "Improved spread spectrum: a new modulation technique for robust watermarking." Signal Processing, IEEE Transactions on 51, No. 4 (Apr. 2003): 898-905.*

(Continued)

*Primary Examiner* — Jason M Repko
*Assistant Examiner* — Carol Wang
(74) *Attorney, Agent, or Firm* — Sughrue Mion, PLLC (57) ABSTRACT

A method of embedding image-related information in an image, the method including: receiving an image including a plurality of frames; receiving information related to the image; generating a codeword by encoding the image-related information; and embedding the image-related information in the image by substituting macroblocks included in at least one of the plurality of frames of the image based on the generated codeword.

11 Claims, 7 Drawing Sheets

(56) References Cited

OTHER PUBLICATIONS

Liu, Hongmei et al., "A MPEG-2 Video Watermarking Algoithm with Compensation in Bit Stream", LNCS 3919, pp. 123-134, 2006.

Ali, Mohammad Athar et al., "Watermarking H3264/AVC by Modifying DC Coefficients", International conference on CyberWorlds, pp. 241-245, 2009.

Choi, Dooseop et al., "A blind MPEG-2 video watermarking robust to camcorder recording", Signal Processing 90, pp. 1327-1332, 2010.

Gong, Xun et al., "Towards Fast and Robust Watermarking Scheme for H.264 Video", Tenth IEEE International Symposium on Multimedia, pp. 649-653, 2008.

Langelaar, Gerrit C. et al., "Real-time Labeling of MPEG-2 Compressed Video", 18th Symposium on Information Theory in the Benelux, pp. 1-30, 1997.

Zhang, Jing et al., "Robust Video Watermarking of H.264/AVC", IEEE Transactions on Circuits and Systems-II, vol. 54, No. 2, pp. 205-209, Feb. 2007.

"Advance video coding for generic audiovisual services" ITU-T, Telecommunication Standardization Sector, 676 pages, 2010.

* cited by examiner

METHOD AND APPARATUS FOR EMBEDDING IMAGE-RELATED INFORMATION IN IMAGE

CROSS-REFERENCE TO RELATED PATENT APPLICATION

This application claims priority from Korean Patent Application No. 10-2012-0034582, filed on Apr. 3, 2012, in the Korean Intellectual Property Office, the disclosure of which is incorporated herein in its entirety by reference.

BACKGROUND

1. Field

Exemplary embodiments relate to a method and apparatus for embedding image-related information in an image, and more particularly, to a method and apparatus for embedding image-related information in an image by substituting macroblocks included in a frame of the image using the image-related information. In addition, exemplary embodiments relate to a method and apparatus for detecting image-related information from an image.

2. Description of the Related Art

The development of digital technology allows anyone to be able to easily use a great amount of digital multimedia data. Unlike analog information, a large amount of digital information can be copied without any loss in quality. This characteristic of the digital information may be a problem in terms of copyright protection.

As a countermeasure against this problem, a technology being discussed as a copyright protection method is insertion of a digital watermark or steganographic label.

Such a scheme of inserting a digital watermark prevents illegal copying of digital content and protects copyrights of the digital content by inserting an arbitrary encryption code predefined between transmission and reception parties of the digital content or a unique identification (ID) of a producer or user of the digital content.

SUMMARY

Exemplary embodiments provide a method and apparatus for embedding image-related information in an image.

Exemplary embodiments provide a method and apparatus for detecting image-related information from an image.

According to an aspect of an exemplary embodiment, there is provided a method of embedding image-related information in an image, the method including: receiving an image consisting of a plurality of frames; receiving information related to the image; generating a codeword by encoding the image-related information; and embedding the image-related information in the image by substituting macroblocks included in at least one of a plurality of frames of the image based on the generated codeword.

The embedding of the image-related information in the image may include: allocating the generated codeword to a first frame of the plurality of frames of the image; and substituting at least one macroblock in the first frame for at least one corresponding macroblock in a second frame based on the allocated codeword.

The second frame may be a reference frame of the first frame.

The allocating of the generated codeword to the first frame of the plurality of frames of the image may include allocating each bit value of the codeword to each corresponding macroblock of the first frame.

The substituting of the at least one macroblock in the first frame for the at least one corresponding macroblock in the second frame based on the allocated codeword may include: acquiring a first macroblock for which a bit value of the allocated codeword is 1; acquiring a second macroblock corresponding to the first macroblock from the second frame; and substituting the first macroblock for the second macroblock.

According to another aspect of an exemplary embodiment, there is provided a method of detecting image-related information embedded in an image, the method including: receiving an image in which information related to the image is embedded; allocating each of a plurality of different codewords to a first frame of a plurality of frames included in the received image; and acquiring a difference between macroblocks included in the first frame and macroblocks included in a second frame for every codeword based on each of the codewords allocated to the first frame.

The method may further include: comparing a plurality of acquired differences with each other; and detecting the embedded image-related information based on a comparison result.

The allocating of each of the plurality of different codewords to the first frame may include allocating bit values of each of the plurality of different codewords allocated one-by-one to the macroblocks in the first frame, respectively, when the plurality of different codewords are allocated one-by-one.

The acquiring of the difference between macroblocks for every codeword may include: acquiring macroblocks for which a bit value of an allocated codeword is 1 from the first frame as a first group; acquiring macroblocks corresponding to the acquired first group from the second frame as a second group; and acquiring a difference between the first group and the second group.

The difference may be acquired in correspondence with each of the plurality of different codewords and determined as a sum of energy values of differences between at least one macroblock included in the first group and at least one macroblock included in the second group.

The comparing of the plurality of acquired differences with each other may include comparing sums of energy values for every codeword with each other.

The detecting of the embedded image-related information based on the comparison result may include: detecting a codeword having a least sum of energy values from among a plurality of sums of energy values; and detecting the embedded image-related information from the detected codeword.

According to another aspect of an exemplary embodiment, there is provided an apparatus for embedding image-related information in an image, the apparatus including: an image receiver for receiving an image consisting of a plurality of frames; an information receiver for receiving information related to the image; a generator for generating a codeword by encoding the image-related information; and an embedder for embedding the image-related information in the image by substituting macroblocks included in at least one of a plurality of frames of the image based on the generated codeword.

The embedder may include: an allocator for allocating the generated codeword to a first frame of the plurality of frames of the image; and a substituter for substituting at least one macroblock in the first frame to at least one corresponding macroblock in a second frame based on the allocated codeword.

The allocator may allocate each bit value of the codeword to each corresponding macroblock of the first frame.

The substituter may include an acquirer for acquiring a first macroblock for which a bit value of the allocated codeword is 1 and acquiring a second macroblock corresponding to the first macroblock from the second frame, and the substituter may substitute the first macroblock for the second macroblock.

According to another aspect of exemplary embodiment, there is provided an apparatus for detecting image-related information embedded in an image, the apparatus including: an image receiver for receiving an image in which information related to the image is embedded; an allocator for allocating each of a plurality of different codewords to a first frame of a plurality of frames included in the received image; and a difference acquirer for acquiring a difference between macroblocks in the first frame and macroblocks in a second frame for every codeword based on each of the codewords allocated to the first frame.

The apparatus may further include: a comparator for comparing a plurality of acquired differences with each other; and a detector for detecting the embedded image-related information based on a comparison result.

The allocator may allocate bit values of each of the plurality of different codewords allocated one-by-one to the macroblocks in the first frame, respectively, when the plurality of different codewords are allocated one-by-one.

The difference acquirer may acquire macroblocks for which a bit value of an allocated codeword is 1 from the first frame as a first group, acquire macroblocks corresponding to the acquired first group from the second frame as a second group, and acquire a difference between the first group and the second group.

The difference may be acquired in correspondence with each of the plurality of different codewords and determined as a sum of energy values of differences between at least one macroblock in the first group and at least one macroblock in the second group.

The comparator may compare sums of energy values for every codeword with each other.

The detector may detect a codeword having a least sum of energy values from among a plurality of sums of energy values and detect the embedded image-related information from the detected codeword.

According to another aspect of an exemplary embodiment, there is provided a computer-readable recording medium storing a computer-readable program for executing the methods described above.

BRIEF DESCRIPTION OF THE DRAWINGS

The above and other features and advantages will become more apparent by describing in detail exemplary embodiments thereof with reference to the attached drawings in which.

DETAILED DESCRIPTION

The terms used in the specification will be schematically described, and then, will be described in detail.

Although general terms as currently used are selected as the terms in the exemplary embodiments while taking functions in the exemplary embodiments into account, they may vary according to an intention of those of ordinary skill in the art, judicial precedents, or the appearance of new technology. In addition, in specific cases, terms intentionally selected by the applicant may be used, and in this case, the meaning of the terms will be disclosed in the corresponding description of the exemplary embodiments. Accordingly, the terms used in the exemplary embodiments should be defined not by simple names of the terms but by the meaning of the terms and the content over the exemplary embodiments.

In the specification, when a certain part "includes" a certain component, this indicates that the part may further include another component instead of excluding another component unless there is no different disclosure. In addition, the term, such as " . . . unit" or "module," disclosed in the specification indicates a unit for processing at least one function or operation, and this may be implemented by hardware, software, or a combination of them.

Hereinafter, exemplary embodiments will be described in detail with reference to the accompanying drawings so that those of ordinary skill in the art may easily realize the exemplary embodiments. However, the exemplary embodiments may be embodied in many different forms and should not be construed as being limited to the embodiments set forth herein. In the drawings, parts irrelevant to the description are omitted to clearly describe the exemplary embodiments, and like reference numerals denote like elements throughout the specification.

Expressions such as "at least one of," when preceding a list of elements, modify the entire list of elements and do not modify the individual elements of the list.

Conventional content distribution tracing and video watermarking schemes have problems in that video quality may be deteriorated and distortion may occur in a watermark when video undergoes a geometric change (rotation, cropping, reduction, etc.) or a temporal change (a change in fps, etc.).

In addition, it is complicated and difficult to perform a decoding or encoding process of watermarked content, and a plurality of watermarks cannot be embedded in video content in real-time.

Figure 1:
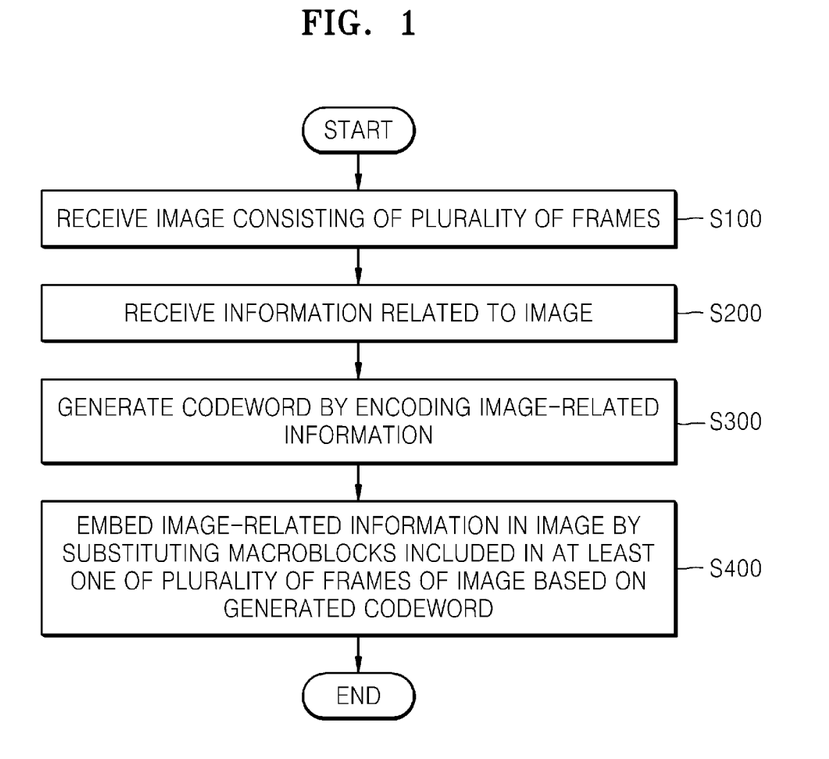
FIG. 1 is a flowchart illustrating a method of embedding image-related information in an image, according to an exemplary embodiment.

FIG. 1 is a flowchart illustrating a method of embedding image-related information in an image, according to an exemplary embodiment.

Referring to FIG. 1, the method may include receiving an image consisting of a plurality of frames (operation S100), receiving information related to the image (operation S200), and generating a codeword by encoding the image-related information (operation S300). In addition, the method may include embedding the image-related information in the image by substituting macroblocks included in at least one of a plurality of frames of the image based on the generated codeword (operation S400).

The image consisting of a plurality of frames in operation S100 may be an image including the plurality of frames in a Group Of Pictures (GOP) unit.

The image-related information according to an embodiment may include at least one of copyright information, image copy/non-copy information, and image distribution information.

The codeword according to an embodiment may be generated in a bit string form longer than bits including the image-related information.

Figure 2:
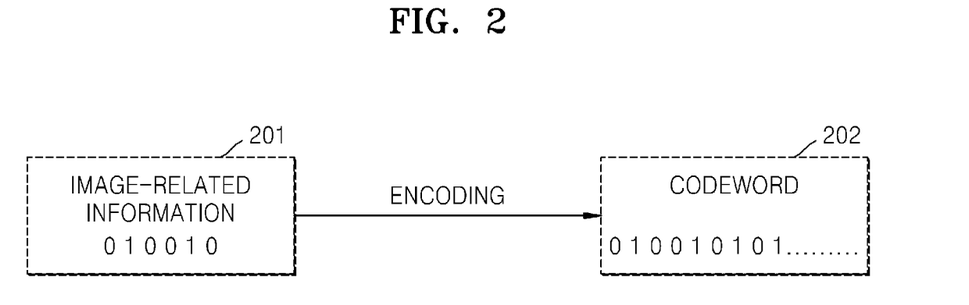
FIG. 2 illustrates a codeword generated by encoding image-related information according to an exemplary embodiment.

FIG. 2 illustrates a codeword 202 generated by encoding image-related information 201 according to an exemplary embodiment.

For example, if the image-related information 201 is represented with 6 bits of 010010, the image-related information 201 may be encoded by an encoder (not shown) in a long bit string form. For example, the image-related information 201 having 6 bits of 010010 may be encoded to the codeword 202 in a form of 010010101 . . . . This long bit string may be a bit string having an infinite length.

Thus, for $2^6$ different pieces of image-related information, there may be $2^6$ codewords. In other words, each of the codewords may be encoded in a long bit string form.

The number of bits in a codeword may be the same as the number of macroblocks in a frame of an image, for example, 8160 for High Definition (HD) and 3600 for Standard Definition (SD).

Figure 3:
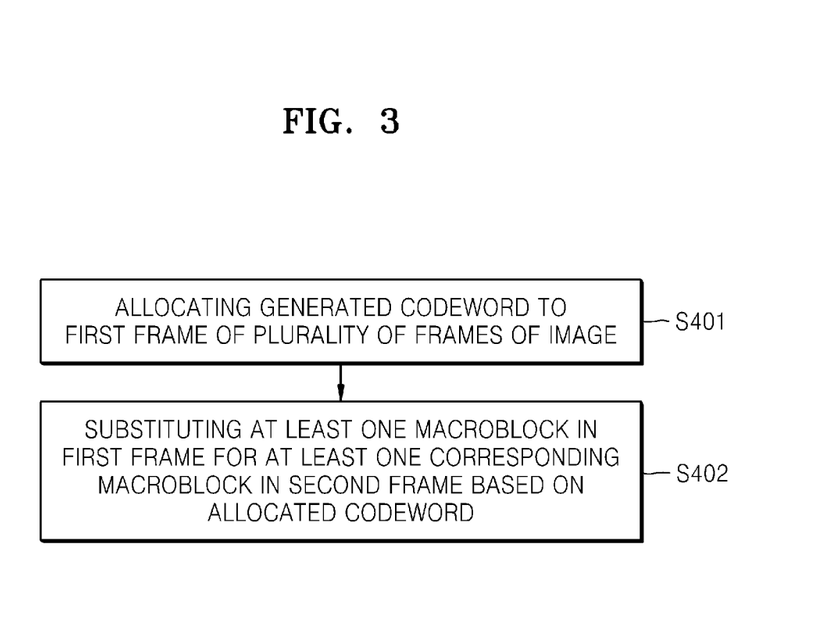
FIG. 3 is a flowchart illustrating an operation of embedding image-related information in an image, according to an exemplary embodiment.
Figure 4:
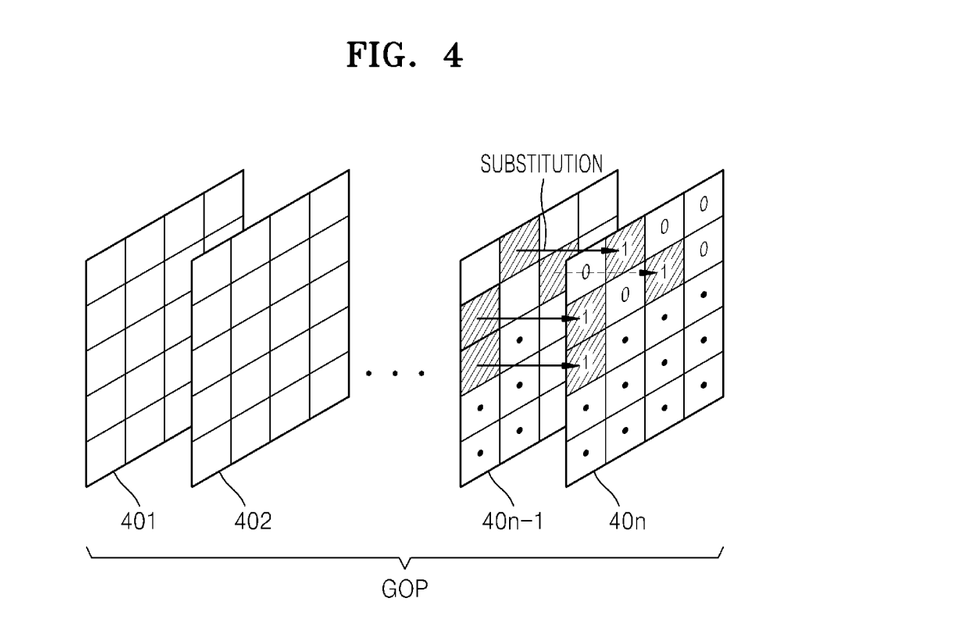
FIG. 4 is an image for describing substitution of macroblocks in an image in a Group of Pictures (GOP) unit, according to an exemplary embodiment.

FIG. 3 is a flowchart illustrating an operation of embedding image-related information in an image, according to an exemplary embodiment. FIG. 4 is an image for describing substitution of macroblocks in an image in a GOP unit, according to an exemplary embodiment.

Referring to FIG. 3, the embedding of the image-related information in the image (operation S400) may include allocating the generated codeword to a first frame of the plurality of frames of the image (operation S401), and substituting at least one macroblock in the first frame for at least one corresponding macroblock in a second frame based on the allocated codeword (operation S402).

The second frame according to an exemplary embodiment may be a previous frame of the first frame. In addition, the second frame may be a reference frame of the first frame. In addition, the first frame may be a final frame of the plurality of frames included in the image in a GOP unit. For example, the second frame may be a previous frame of the final frame.

The reference frame may be a frame decoded immediately before the first frame. For example, a subsequent frame may be formed based on a reference frame in an H.264 encoding/decoding operation. In other words, a previously formed frame may be decoded and used as a reference to form a future frame in the encoding/decoding operation, and this previously formed frame may be a reference frame.

The allocating of the generated codeword to the first frame of the plurality of frames of the image (operation S401) may include allocating each bit value of the codeword to every macroblock in the first frame.

Referring to FIG. 4, bit values of the generated codeword may be allocated to macroblocks included in one of the plurality of frames one-by-one. For example, bit values of a codeword generated in a form of 010010101 . . . may be sequentially allocated from the top to macroblocks in a first frame 40n of a GOP.

The substituting of the at least one macroblock in the first frame for the at least one corresponding macroblock in the second frame based on the allocated codeword (operation S402) may include acquiring a first macroblock for which a bit value of the allocated codeword is 1, acquiring a second macroblock corresponding to the first macroblock from the second frame, and substituting the first macroblock for the second macroblock.

Referring to FIG. 4, macroblocks in the first frame 40n for which a bit value of an allocated codeword is 1 may be substituted for macroblocks at corresponding locations in a second frame 40n−1.

Such substitution of macroblocks may allow the image-related information to be embedded in the image.

Figure 5:
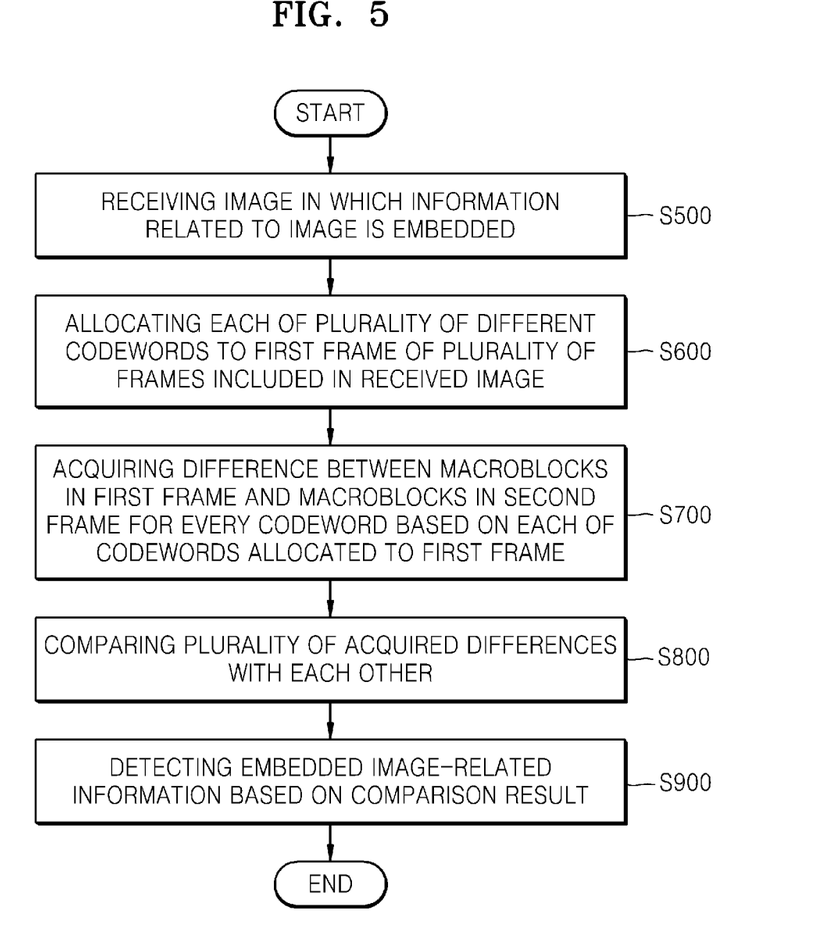
FIG. 5 is a flowchart illustrating a method of detecting image-related information embedded in an image, according to an exemplary embodiment.

FIG. 5 is a flowchart illustrating a method of detecting image-related information embedded in an image, according to an exemplary embodiment.

Referring to FIG. 5, the method may include receiving an image in which information related to the image is embedded (operation S500), allocating each of a plurality of different codewords to a first frame of a plurality of frames included in the received image (operation S600), and acquiring a difference between macroblocks in the first frame and macroblocks in a second frame for every codeword based on each of the codewords allocated to the first frame (operation S700).

The method may further include comparing a plurality of acquired differences with each other (operation S800) and detecting the embedded image-related information based on a comparison result (operation S900).

The second frame according to an exemplary embodiment may be a previous frame of the first frame. For example, the second frame may be a reference frame of the first frame. The reference frame may be a frame decoded immediately before the first frame.

The image-related information may include at least one of copyright information, image copy/non-copy information, and image distribution information.

The allocating of each of a plurality of different codewords to the first frame (operation S600) may include allocating bit values of each of the plurality of different codewords allocated one-by-one to the macroblocks in the first frame, respectively, when the plurality of different codewords are allocated one-by-one. As described above, allocating of bit values of a codeword to macroblocks, respectively, may include allocating bit values of the codeword to macroblocks in the first frame, respectively.

The first frame may be a final frame of the plurality of frames included in the image in a GOP unit. In addition, the second frame may be a previous frame of the final frame.

Figure 6:
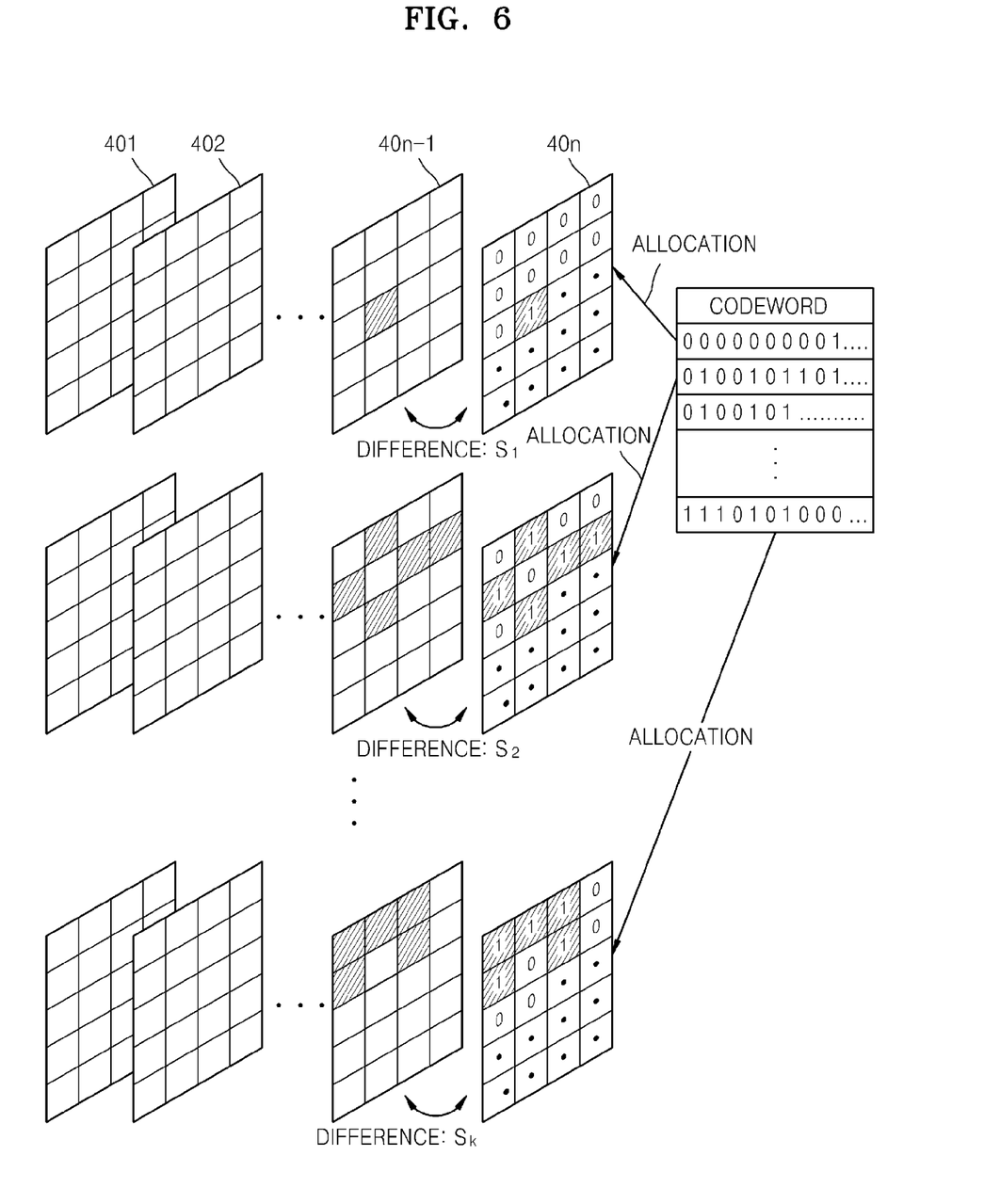
FIG. 6 is an image for describing allocation of a plurality of codewords to macroblocks and acquisition of a difference between the macroblocks based on the plurality of allocated codewords, according to an exemplary embodiment.

FIG. 6 is an image for describing allocation of a plurality of codewords to macroblocks and acquisition of a difference between the macroblocks based on the plurality of allocated codewords, according to an exemplary embodiment.

Referring to FIG. 6, each of a plurality of different codewords may be allocated to a first frame. The plurality of different codewords may be generated by a seed-based pseudo-random generator. The seed-based pseudo-random generator may include, for example, a linear feedback shift register. However, it is noted that the generation of the codewords is not limited to the use of the seed-based pseudo-random generator and other devices and/or methods may be used.

Figure 7:
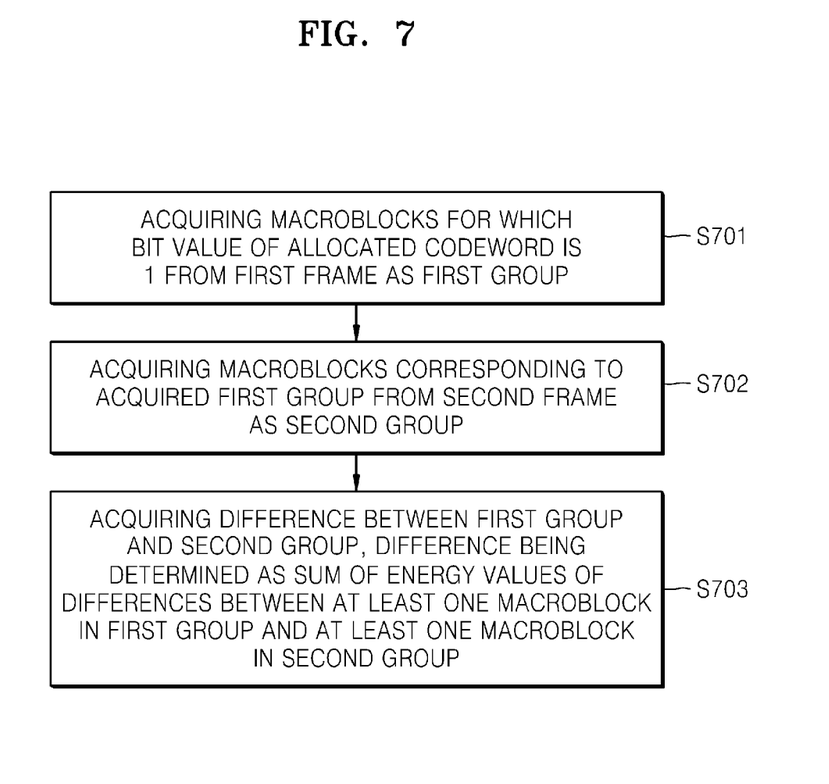
FIG. 7 is a flowchart illustrating an operation of acquiring a difference between the macroblocks, according to an exemplary embodiment.

FIG. 7 is a flowchart illustrating an operation of acquiring a difference between the macroblocks, according to an exemplary embodiment.

Referring to FIG. 7, the acquiring of the difference between the macroblocks for every codeword (operation S700) may include acquiring macroblocks for which a bit value of an allocated codeword is 1 from the first frame as a first group (operation S701), acquiring macroblocks corresponding to the acquired first group from the second frame as a second group (operation S702), and acquiring a difference between the first group and the second group (operation S703).

The difference may be acquired in correspondence with each of the plurality of different codewords and determined as a sum of energy values of differences between at least one macroblock in the first group and at least one macroblock in the second group.

Referring back to FIG. 6, a difference S1 between macroblocks in a frame 40n to which a codeword of 0000000001 . . . is allocated and macroblocks in a reference frame (e.g., a frame 40n−1) may be acquired. For example, for the frame 40n to which the codeword of 0000000001 . . . is allocated, the difference S1 between macroblocks in a first frame for which an allocated bit value is 1 and macroblocks at corresponding locations in a second frame may be acquired.

In the same manner, a difference S2 between macroblocks in the frame 40n to which a codeword of 0100101101 . . . is allocated and macroblocks in its reference frame (e.g., the frame 40n−1) may be acquired. Likewise, for a plurality of codewords, differences $S_1$ and $S_2$ to $S_k$ between macroblocks (in the frame 40n and the frame 40n−1) may be acquired.

The difference between macroblocks may include a pixel value difference between the macroblocks in the first frame and corresponding macroblocks in the second frame, and this difference may be acquired for every allocated codeword.

In other words, the difference may be determined as a sum of energy values of differences between at least one macroblock in the first frame for which an allocated bit value is 1 and at least one macroblock at corresponding locations in the second frame. For example, an energy value may include a statistical mean value of pixel values. An energy value may include a mean value of pixel values of a macroblock in the first group and pixel values of a macroblock in the second group.

The comparing of the plurality of acquired differences with each other (operation S800) may include comparing the differences $S_1$ and $S_2$ to $S_k$ determined for the codewords with each other. In other words, the comparing of the plurality of acquired differences with each other (operation S800) may include comparing sums of energy values determined for the codewords with each other. For example, the comparing of the plurality of acquired differences with each other (operation S800) may include comparing sums of energy values determined in correspondence with allocated codewords with each other. In other words, the comparing of the plurality of acquired differences with each other (operation S800) may include comparing the differences $S_1$ and $S_2$ to $S_k$ between frames with each other.

The detecting of the embedded image-related information based on a comparison result (operation S900) may include detecting a codeword having a least sum of energy values from among a plurality of sums of energy values and detecting the embedded image-related information from the detected codeword.

For example, a codeword identical to a codeword used in an embedding operation from among the plurality of different codewords may have a least value as an inter-frame difference. Preferably, the least value may be zero because macroblocks in the first frame for which an allocated bit value is 1 are identical to macroblocks at corresponding locations in the second frame.

Thus, the detecting of the codeword having a least sum of energy values from among the plurality of sums of energy values may include detecting a codeword for which the determined differences $S_1$ and $S_2$ to $S_k$ have a small value. Preferably, the detecting of the codeword having a least sum of energy values from among the plurality of sums of energy values may include detecting a codeword for which the determined differences $S_1$ and $S_2$ to $S_k$ have the least value.

The detecting of the embedded image-related information from the detected codeword may include detecting image-related information by decoding the detected codeword.

Figure 8:
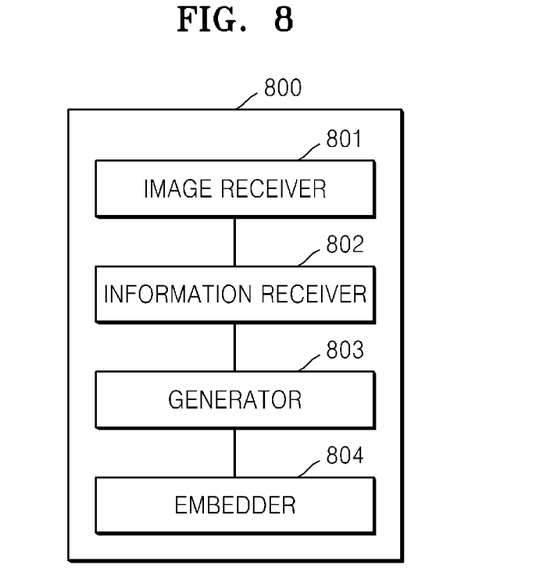
FIG. 8 is a block diagram of an apparatus for embedding image-related information in an image, according to an exemplary embodiment.

FIG. 8 is a block diagram of an apparatus 800 for embedding image-related information in an image, according to an exemplary embodiment.

The apparatus 800 may include an image receiver 801 for receiving an image consisting of a plurality of frames, an information receiver 802 for receiving information related to the image, a generator 803 for generating a codeword by encoding the image-related information, and an embedder 804 for embedding the image-related information in the image by substituting macroblocks included in at least one of a plurality of frames of the image based on the generated codeword.

The image-related information may include at least one of copyright information, image copy/non-copy information, and image distribution information. In addition, the codeword may be generated in a bit string form longer than bits including the image-related information.

Figure 9:
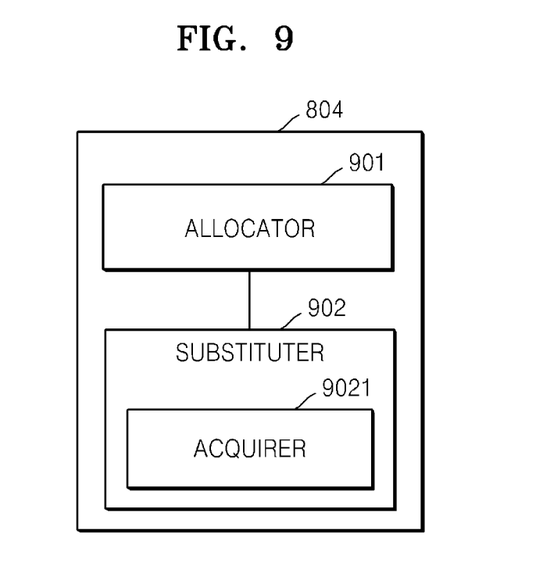
FIG. 9 is a block diagram of an embedder of the apparatus of FIG. 8.

FIG. 9 is a block diagram of the embedder 804 of the apparatus 800 of FIG. 8.

The embedder 804 may include an allocator 901 for allocating the generated codeword to a first frame of the plurality of frames of the image and a substituter 902 for substituting at least one macroblock in the first frame for at least one corresponding macroblock in a second frame based on the allocated codeword.

The second frame may be a previous frame of the first frame. In addition, the second frame may be a reference frame of the first frame. For example, the reference frame may be a frame decoded immediately before the first frame.

The first frame may be a final frame of the plurality of frames included in the image in a GOP unit. For example, the second frame may be a previous frame of the final frame.

The allocator 901 may allocate each bit value of the codeword to each corresponding macroblock of the first frame.

The substituter 902 may include an acquirer 9021 for acquiring a first macroblock for which a bit value of the allocated codeword is 1 and acquiring a second macroblock corresponding to the first macroblock from the second frame. In addition, the substituter 902 may substitute the first macroblock for the second macroblock.

Figure 10:
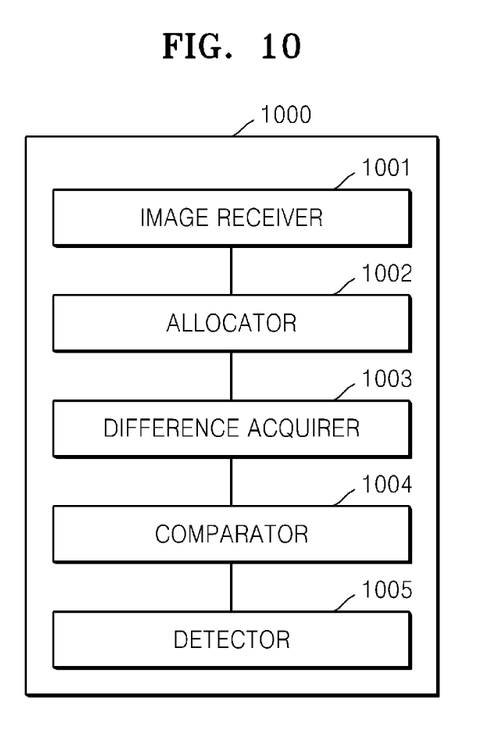
FIG. 10 is a block diagram of an apparatus for detecting image-related information embedded in an image, according to an embodiment.

FIG. 10 is a block diagram of an apparatus 1000 for detecting image-related information embedded in an image, according to an exemplary embodiment.

The apparatus 1000 may include an image receiver 1001 for receiving an image in which information related to the image is embedded, an allocator 1002 for allocating each of a plurality of different codewords to a first frame of a plurality of frames included in the received image, and a difference acquirer 1003 for acquiring a difference between macroblocks in the first frame and macroblocks in a second frame for every codeword based on each of the codewords allocated to the first frame.

The apparatus 1000 may further include a comparator 1004 for comparing a plurality of acquired differences with each other and a detector 1005 for detecting the embedded image-related information based on a comparison result.

The second frame may be a previous frame of the first frame. In addition, the second frame may be a reference frame of the first frame. For example, the reference frame may be a frame decoded immediately before the first frame.

The image-related information may include at least one of copyright information, image copy/non-copy information, and image distribution information.

The allocator 1002 may allocate bit values of each of the plurality of different codewords allocated one-by-one to the macroblocks in the first frame, respectively, when the plurality of different codewords are allocated one-by-one.

The first frame may be a final frame of the plurality of frames included in the image in a GOP unit. In addition, the second frame may be a previous frame of the final frame.

The difference acquirer 1003 may acquire macroblocks for which a bit value of an allocated codeword is 1 from the first frame as a first group, acquire macroblocks corresponding to the acquired first group from the second frame as a second group, and acquire a difference between the first group and the second group.

The difference may be acquired in correspondence with each of the plurality of different codewords. In addition the difference may be determined as a sum of energy values of differences between at least one macroblock in the first group and at least one macroblock in the second group.

The comparator 1004 may compare sums of energy values for every codeword allocated from among the plurality of different codewords with each other.

The detector 1005 may detect a codeword having a least sum of energy values from among a plurality of sums of energy values and detect the embedded image-related information from the detected codeword.

As a reference, components performing similar functions in the apparatus 800 of FIG. 8 and the apparatus 1000 of FIG. 10 may correspond to each other. For example, the image receiver 801 of the apparatus 800 of FIG. 8 may correspond to the image receiver 1001 of the apparatus 1000 of FIG. 10. In addition, the allocator 901 of the apparatus 800 of FIG. 8 may correspond to the allocator 1002 of the apparatus 1000 of FIG. 10.

The methods described above may be applied to the apparatuses 800 and 1000, respectively. Thus, the descriptions of the methods are not repeated in the description of the apparatuses 800 and 1000.

The embedding method and the embedded information detecting method according to exemplary embodiments provide several advantages such as those discussed below but are not limited thereto.

By substituting macroblocks in correspondence with codewords, it is possible to embed invisible information in content. In other words, compared with conventional watermarking schemes, it is possible to embed image-related information in an image while preventing deterioration of the image.

With the method of embedding image-related information according to an exemplary embodiment, robustness against image cropping, a size change, such as magnification/reduction, transcoding, cam-coding, and other distortions may be provided.

In addition, real-time processing of video can be performed on low-power devices, such as a digital television (DTV) and a telephone, without decompressing the video, and since original content does not have to be compared with information-embedded content, blind detection can be performed even though the original content is not available.

The exemplary embodiments can be written as computer programs and can be implemented in general-use digital computers that execute the programs using a computer-readable recording medium. Examples of the computer-readable recording medium include but are not limited to storage media such as magnetic storage media (e.g., ROM, floppy disks, hard disks, etc.), optical recording media (e.g., CD-ROMs, or DVDs), and carrier waves (e.g., transmission through the Internet).

While the inventive concept has been particularly shown and described with reference to exemplary embodiments thereof, it will be understood by those of ordinary skill in the art that various changes in form and details may be made therein without departing from the spirit and scope of the present inventive concept as defined by the following claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. A method of detecting image-related information embedded in an image, the method comprising:
   receiving the image in which the image-related information is embedded;
   allocating each of a plurality of different codewords to a first frame of a plurality of frames included in the received image;
   acquiring a difference between macroblocks in the first frame and macroblocks in a second frame for every codeword based on each of the codewords allocated to the first frame;
   comparing a plurality of acquired differences with each other; and
   detecting the embedded image-related information based on a comparison result,
   wherein the second frame is a reference frame of the first frame, and
   wherein the acquiring of the difference between macroblocks for every codeword comprises:
      acquiring macroblocks for which a bit value of an allocated codeword is 1 from the first frame as a first group;
      acquiring macroblocks corresponding to the acquired first group from the second frame as a second group; and
      acquiring a difference between the first group and the second group, wherein the difference is acquired in correspondence with each of the plurality of different codewords and is determined as a sum of energy values of differences between at least one macroblock in the first group and at least one macroblock in the second group.

2. The method of claim 1, wherein the image-related information includes at least one of copyright information, image copy/non-copy information, and image distribution information.

3. The method of claim 1, wherein the allocating of each of the plurality of different codewords to the first frame comprises allocating bit values of each of the plurality of different codewords allocated one-by-one to the macroblocks in the first frame, respectively, when the plurality of different codewords are allocated one-by-one, wherein the first frame is a final frame of the plurality of frames included in the image in a Group of Pictures (GOP) unit.

4. The method of claim 1, wherein the comparing of the plurality of acquired differences with each other comprises comparing sums of energy values for every codeword with each other.

5. The method of claim 4, wherein the detecting of the embedded image-related information based on the comparison result comprises:
   detecting a codeword having a least sum of energy values from among a plurality of sums of energy values; and
   detecting the embedded image-related information from the detected codeword.

6. A non-transitory computer-readable recording medium storing a computer-readable program for executing the method of claim 1.

7. An apparatus for detecting image-related information embedded in an image, the apparatus comprising:
   an image receiver which receives an image in which information related to the image is embedded;
   an allocator which allocates each of a plurality of different codewords to a first frame of a plurality of frames included in the received image;
   a difference acquirer which acquires a difference between macroblocks in the first frame and macroblocks in a second frame for every codeword based on each of the codewords allocated to the first frame;
   a comparator which compares a plurality of acquired differences with each other; and
   a detector which detects the embedded image-related information based on a comparison result,
   wherein the second frame is a reference frame of the first frame, and
   wherein the difference acquirer acquires macroblocks for which a bit value of an allocated codeword is 1 from the first frame as a first group, acquires macroblocks corresponding to the acquired first group from the second frame as a second group, and acquires a difference between the first group and the second group, wherein the difference is acquired in correspondence with each of the plurality of different codewords and is determined as a sum of energy values of differences between at least one macroblock in the first group and at least one macroblock in the second group.

8. The apparatus of claim 7, wherein the image-related information includes at least one of copyright information, image copy/non-copy information, and image distribution information.

9. The apparatus of claim 7, wherein the allocator allocates bit values of each of the plurality of different codewords allocated one-by-one to the macroblocks in the first frame, respectively, when the plurality of different codewords are allocated one-by-one,
   wherein the first frame is a final frame of the plurality of frames included in the image in a Group of Pictures (GOP) unit.

10. The apparatus of claim 7, wherein the comparator compares sums of energy values for every codeword with each other.

11. The apparatus of claim 10, wherein the detector detects a codeword having a least sum of energy values from among a plurality of sums of energy values and detects the embedded image-related information from the detected codeword.

* * * * *